United States Patent [19]

Lopez

[11] Patent Number: 5,874,671
[45] Date of Patent: Feb. 23, 1999

[54] INSTRUMENTED DEVICE OF SMALL THICKNESS FORMING A SKIN

[75] Inventor: Christian Lopez, Le Castera, France

[73] Assignee: Aerospatiale Societe Nationale Industrielle, Paris Cedex, France

[21] Appl. No.: 871,958

[22] Filed: Jun. 10, 1997

[30] Foreign Application Priority Data

Jun. 10, 1996 [FR] France .................................. 96 07384

[51] Int. Cl.⁶ .................................................. G01M 9/00
[52] U.S. Cl. ............................................ 73/147; 73/178 R
[58] Field of Search ................................... 73/147, 178 R

[56] References Cited

U.S. PATENT DOCUMENTS

| | | |
|---|---|---|
| 2,440,198 | 4/1948 | Green . |
| 4,309,901 | 1/1982 | Rolinski et al. ........................... 73/147 |
| 4,526,031 | 7/1985 | Weisand, Jr. et al. ..................... 73/147 |
| 4,688,422 | 8/1987 | Wood ........................................ 73/147 |
| 4,727,751 | 3/1988 | Holmes et al. . |
| 4,782,319 | 11/1988 | Dell'Acqua et al. . |
| 4,901,565 | 2/1990 | Seidel et al. ........................... 73/178 R |
| 5,272,915 | 12/1993 | Gelbach et al. ........................... 73/147 |

*Primary Examiner*—George Dombroske
*Assistant Examiner*—Paul D. Amrozowicz
*Attorney, Agent, or Firm*—Young & Thompson

[57] ABSTRACT

An instrumented device for the study of airflow over a structure (10), comprises a support (16) forming a thin plate (24) adapted to be applied and shaped to the contour of a predetermined region of the structure. Connection structure (22) cements a portion of an inner surface of the support to that predetermined region, leaving a space (36) of low height between an inner surface of the plate (24) of the support and that predetermined region. This height is substantially equal to the thickness of said cementing structure. Instrumentation (18) is connected to the support, a portion (28) of this instrumentation and wire connections (20) therefor being disposed in that space (36), whereby the device is adapted to form a skin on the structure.

19 Claims, 5 Drawing Sheets

INSTRUMENTED DEVICE OF SMALL THICKNESS FORMING A SKIN

BACKGROUND OF THE INVENTION

The present invention has for its object an instrumented device of very small thickness such as a skin, adapted to be applied removably on any surface, particularly for studying aerodynamic flow over an external wall of an aircraft structure.

BRIEF DESCRIPTION OF THE RELATED ART

The study of aerodynamic flow on structures which must move at high speed in the atmosphere is extremely important.

For land vehicles, it is the improvement of performance which can be sought so as to obtain gains in speed or in fuel consumption for example, or even in comfort relative to noise, but also for improvement of holding the road.

For aircraft, more particularly fleet airplanes, it is known that the study of aerodynamic flow is even more important, for the improvement of flight performance and particularly to decrease the shock wave, which is to say the passage from laminar to turbulent airflow over the structure.

Studies permit providing decreases particularly in fuel consumption, which translates to an airplane less expensive to use or having a greater flying range for a same quantity of carried fuel.

Such studies can also permit decreases of sonic emissions or improvement thereof by treatment of localized regions.

It is known, from these various applications which are far from being complete, that the possibility of carrying out different types of measurements of aerodynamic flow is a requirement.

The types of measurements that can interest those in the art are very various and correspond to similarly various instrumentations, such as:

- static pressure gauges, connected to pressure detectors located in accessible zones,
- instantaneous pressure detectors permitting measuring variations over a range from turbulence to sonic,
- hot films.

It has also been sought to display the quality of flow by thermal contrast with the aid of:

- infrared visualization means of the temperature variations of the heated structures,
- liquid crystals permitting visualizing the flow on heated and thermally regulated structures.

The drawbacks of carrying out such measurements in situ are numerous.

It is thus necessary that the instrumentation disturbs as little as possible the flow, so as to obtain true measurements.

The instrumentation on an airplane is subjected to very wide temperature changes, more than 100° C., to violent mechanical forces, particularly to the point of pulling loose and to retaining surfaces that are not necessarily flat.

On the other hand, such measurements are of interest not only in a wind tunnel but also and above all as measurements on the aircraft in flight.

However, it is known that modifications of the structure of an airplane such as piercing or machining are difficult to design. These modifications lead to prohibitive costs of measurement programs because any machining on the structure requires complementary studies and computations at least to determine the impact of such modifications, which generally leads to a process for making the modifications which is often impossible to apply to an aircraft outside the factory.

Once such modifications are made and used for the intended purpose, generally a series of measurements and recordations with the aid of acquisition apparatus disposed in the structure, it is necessary to return the structure to its original condition, when the modifications are considered to be reversible.

This return in condition, plugging the holes, filling in the hollows, painting, gives rise to costs, time and immobilization of the aircraft in the factory.

The instrumentation, even if one ignores the foregoing difficulties, must also be disturbed as little as possible, which is complicated without making profound structural modifications.

There remains the problem of wire connections of the instrumentation, between the acquisition apparatus and the detectors for which the machining has been performed.

There is known from U.S. Pat. No. 5,149,387, a mounting adapted to secure on the structure a glass fiber plate with mounting of detectors using a delicate procedure of which one step is particularly the application of vacuum to the region of implantation of the detector.

SUMMARY OF THE INVENTION

So as to overcome the drawbacks of the prior art, the present invention provides an instrumentation which does not give rise to any damage to the structure and which is not very costly because it can be emplaced on the structure without requiring return to the factory. Thus, for an aircraft, more particularly an airplane, the instrumented device according to the invention can be emplaced and removed in situ, outside the factory, at any time in the test series in flight for example, whilst using a procedure and methodology guaranteeing quality and reproducibility. The devices are themselves produced in the factory having account for all the requirements imposed by the place of application.

The present invention is of particular interest in the sense that application of the device gives rise to no mechanical modification.

The instrumented device according to the invention permits mounting numerous types of detectors, which can moreover be mixed as needed.

The costs of such instrumentation are reduced, for various reasons:

- a short time to apply and remove, hence a short time of immobilization, and in any case in situ,
- prefabrication in the factory of devices ready to be applied, by using standardized operations under good conditions with tooling and means generally available in these factories, particularly aircraft factories,
- possibility of relatively quick modification of the device, and
- emplacement on a vehicle, particularly an airplane, at a place different from that of production, and
- use of materials of commerce for the consumable portion of the instrumentation device.

To this end, the instrumented device according to the invention, particularly for the study of aerodynamic flow over a structure, more particularly that of an aircraft in flight, is characterized in that it comprises a support forming a plate of very small thickness, provided to be applied and shaped on a predetermined region of said structure, cement connection means interposed between a portion of the inner surface of the support and this predetermined region, leaving a space of low height between the inner surface of the support and the predetermined region corresponding substantially to the thickness of the cement means as well as instrumentation applied on this support, a portion of the elements of said instrumentation as well as the wire connections being disposed in this space delimited by the inner surface of the support and the predetermined region of the structure, the assembly forming a skin on said structure.

According to a particular embodiment, the cement connection means comprise an adhesive double-faced strip of a thickness of the order of a millimeter.

The adhesive strip comprises an adhesive strip of the "Neoprene" foam type, disposed in strips, parallel to the airflow and the strongly adherent strip, of the acrylic type, disposed in strips perpendicular to the airflow.

More particularly, the support is a plate of metal or polymeric material of small width and great length adapted to cover the region in question and prolonged to adjacent a natural access region within the structure.

There is also provided a chamfer about the periphery of the support.

The chamfer is comprised of a strip disposed about the periphery of the support, over a width at least equal to that of the chamfer, as well as mastic as filling and coating material forming a substantially triangular cross section.

According to an improvement, the chamfer comprises a reinforced adhesive strip applied to at least one portion of the surface of the adhesive strip.

According to another improvement, the device comprises a traction filament, disposed behind the adhesive strip of high strength, provided at its ends with gripping means, embedded in the mastic, so as to facilitate its emplacement.

The instrumentation comprises detectors fixed on the inner surface of the support, communication passages of the detectors with the airflow at the external surface of the support and filamentary connections between the detectors and the interior of the structure, said connections extending into the free space between the inner surface of the support and the predetermined region.

According to one embodiment, the instrumentation comprises at least one layer of material substantially applied to the external surface of the support and at least two wires connected to this layer through two through-holes.

According to a preferred arrangement, each wire is a bare electric wire disposed in the hole and the conductive paste is introduced into the through-hole so as to ensure immobilization of the wire, the electrical connection and simultaneously the closing of this hole and the continuity of the aerodynamic profile.

In the case of a stationary pressure gauge, there is provided a collector having a recess provided in this collector, holes machined through the metallic plate with high precision to obtain an exact border, these holes opening into the recess, as well as a rigid ferrule and a flexible connection tube.

Another modification provides a layer of thermosensitive crystals disposed in the external surface of the plate of said support.

An improvement consists in a resistance disposed on the internal surface of the plate, provided to reheat said plate and/or to adjust it in temperature.

According to still another embodiment, there is provided a flush detector for measuring instantaneous pressure, integrated into the support plate.

Preferably, the support has a thickness of the order of one millimeter for a metallic plate or for a plate epoxy resin.

BRIEF DESCRIPTION OF THE DRAWINGS

The device according to the present invention is described with respect to a preferred embodiment, which is not limiting, and in connection with various modifications, this description being given with respect to the accompanying drawings, in which the different figures represent.

BRIEF DESCRIPTION OF THE PREFERRED EMBODIMENTS

Figure 1:
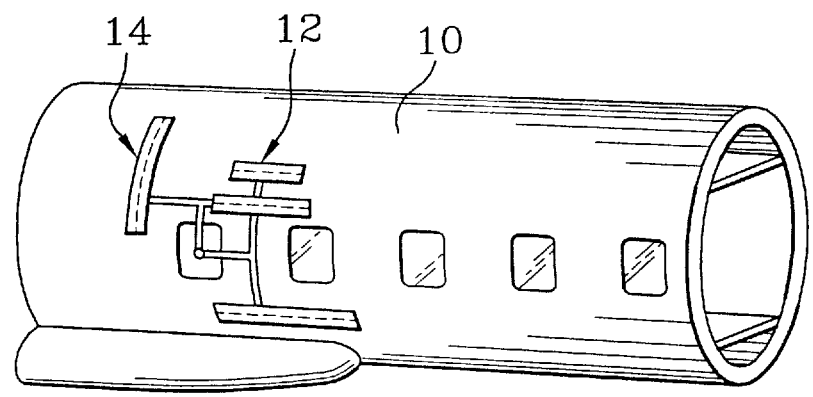
FIG. 1, a view of a section of an aircraft carrying the instrumented device according to the invention.
Figure 2:
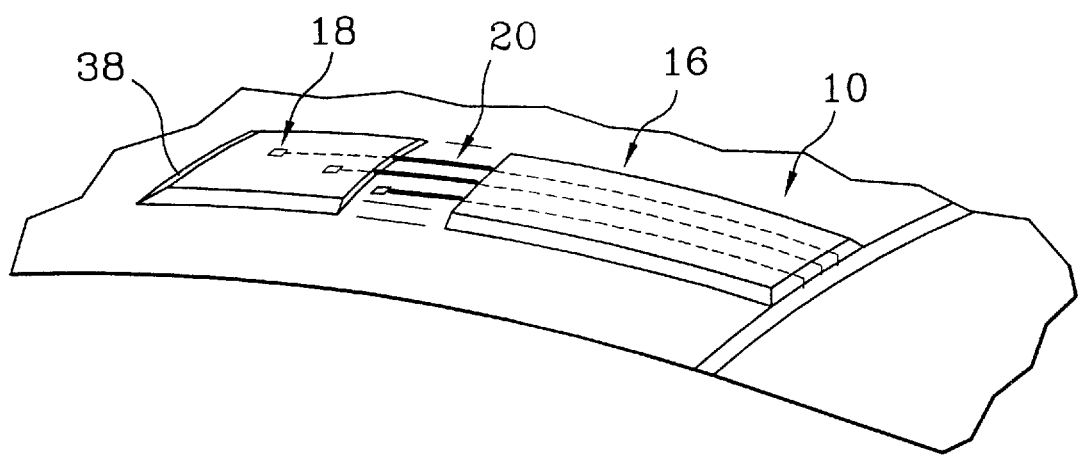
FIG. 2, a perspective view of a curvate portion of a structure carrying the instrumented device according to the invention, for example adjacent a natural opening such as a flap articulation.

In FIG. 1, there is a shown a portion of an aircraft hull 10, on the external wall of which is installed an assembly of instrumented devices 12 according to the present invention with their connector wires 14.

Thus, all the instrumented devices are connected within the cell to known data acquisition means (not shown), provided to collect all the data from the test program.

The wire connections 14 are provided to penetrate through natural openings in the structure, windows, hinges for movable portions of the wings, ailerons or the like so as to avoid any mechanical modification of the structure.

Each instrumented device is comprised of a support provided to be applied to the predetermined region and selected for implantation. This support is produced in the factory as a function of the shape constraints and the instrumentation provided for the tests.

Thus, the device is ready to apply according to a procedure established to guarantee the quality and reliability as well as the reproducibility but it remains simple and rapid as will be explained hereinafter in detail.

Generally speaking, each device comprises, as is shown in FIGS. 2 and 3A, 3B and 3C, a support 16 which is strong but sufficiently flexible to be shaped according to the profile of the region onto which it is to be applied. This support 16 is generally a plate 24, metallic or of polymeric material according to the uses as indicated above in the description.

This plate 24, for example metallic or of polymeric material such as epoxy, is of small thickness, of the order of a millimeter.

These plates are more particularly relatively narrow bands to permit instrumentation generally along the lines of airflow, which is to say parallel to the air streams or perpendicular thereto.

The plate is provided in the factory with all the functional elements, comprising detectors 18 and the bundle of connections 20 in question, or securement means 22 for said plate on the structure.

Figure 3A:
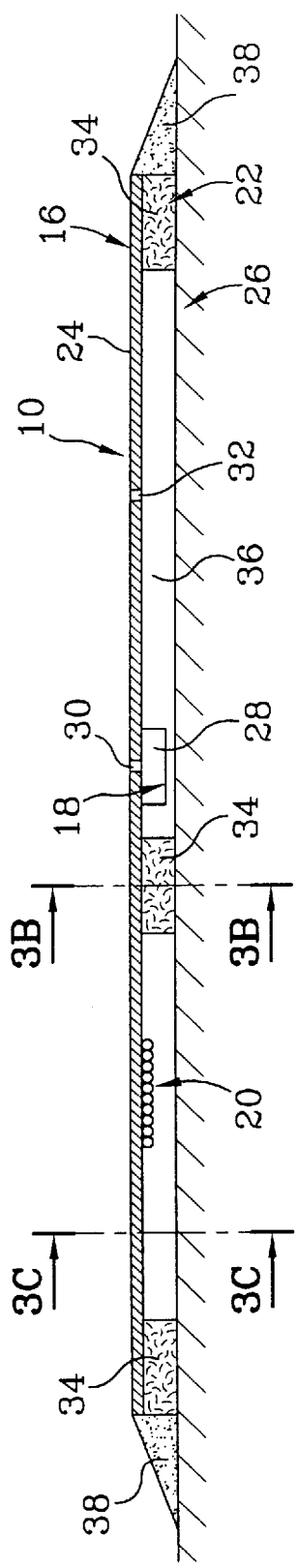
FIG. 3A, a transverse cross-sectional view of an instrumented device such as that of FIG. 2.

In FIG. 3A, there is shown a first embodiment from a metallic plate 24 of one millimeter thickness which is applied on a predetermined region of the structure bearing the general reference numeral 26.

The detectors 18 are of very small thickness and in the present case, it is a pressure gauge 28 cemented on the internal surface of the plate 24, a hole 30 being provided through the plate directly in the exact region of the pressure gauge, determined as a function of the measurements to be recorded.

The plate also comprises holes 32 for pressure equalization which permit equalizing the pressures between the exterior and the volume of air trapped beneath the plate, pressure differences which could give rise to errors of measurement and above all over-pressure generating forces to tear the plate from the structure. Such holes can have diameters of the order of a millimeter.

Each detector 28, for pressure detection in this instance, is connected by a cable or a tube, assembled in a bundle, to the data acquisition means located within the structure and not shown. This bundle of connections is led through a passage already existing in the structure, immediately adjacent the place of application of the plate, this passage previously existing, or being adapted to be provided in the case of windows or movable hinges of the structure, to permits its sealed passage, to ensure the securement and guidance under cover for example adjacent other cable paths of the structure.

These tubes or cables in a bundle are secured directly to the plate by cementing or in a collector also connected by cementing.

The securement means 22 of the plate 24 provided on the structure comprise:
- on the one hand, parallel to the air stream or perpendicular to the attack edges or trailing edges, a strip 34 of double-faced adhesive foam of the "Neoprene" type, spaced and applied in strips on the internal surface of the plate 24 by its unprotected cementing face, the other surface remaining protected by a film which is withdrawn at the moment of application of the plate to the predetermined region, and
- on the other hand, perpendicular to the air stream, a strip 35 of great strength, of the acrylic type, receiving the ends of the strips of strip 34, in Neoprene foam.

These strips of double-faced adhesive foam and acrylic have a thickness of the order of one millimeter, which leaves free a volume 36 between the metallic plate 34 and the structure 26.

Figure 3B:
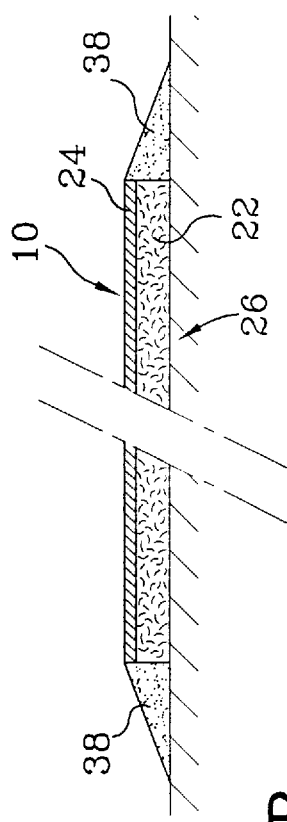
FIG. 3B, a cross-sectional view on the line 3B—3B of FIG. 3A.
Figure 3C:
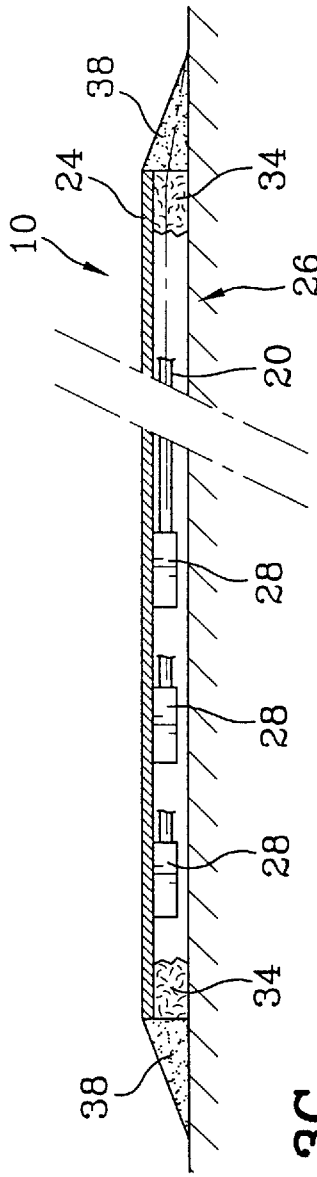
FIG. 3C, a longitudinal cross-sectional view on the line 3C—3C of FIG. 3A.

As is shown in the various FIGS. 3A, 3B and 3C, the total thickness of the device is of the order of two millimeters more or less.

This thickness itself, although very small, could generate disturbances in the airflow, not because of the intrinsic value of the thickness but above all by the turbulence of the airflow about the edges.

Also there is provided a peripheral chamfer 38, which smooths out the adverse effects of the edge and which also fulfills other functions.

Figure 6:
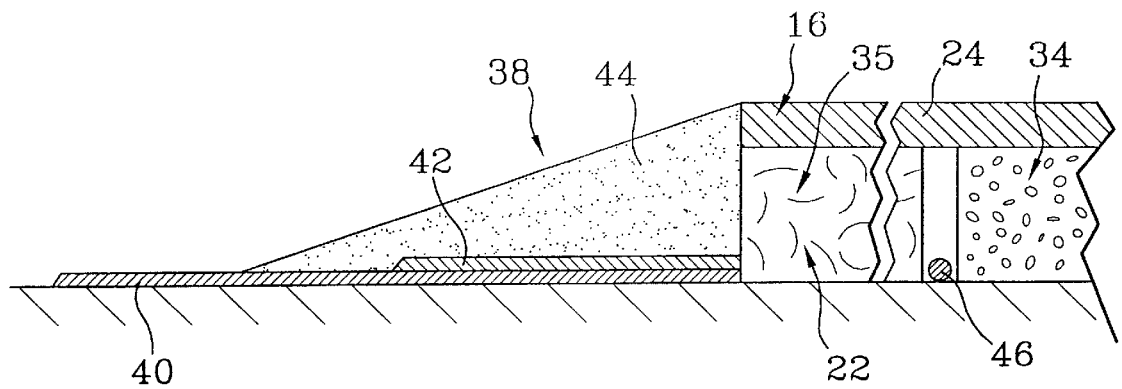
FIG. 6, a detailed view of the connections of the device with the structure on which it is mounted, and more particularly on the chamfered edges.
Figure 7:
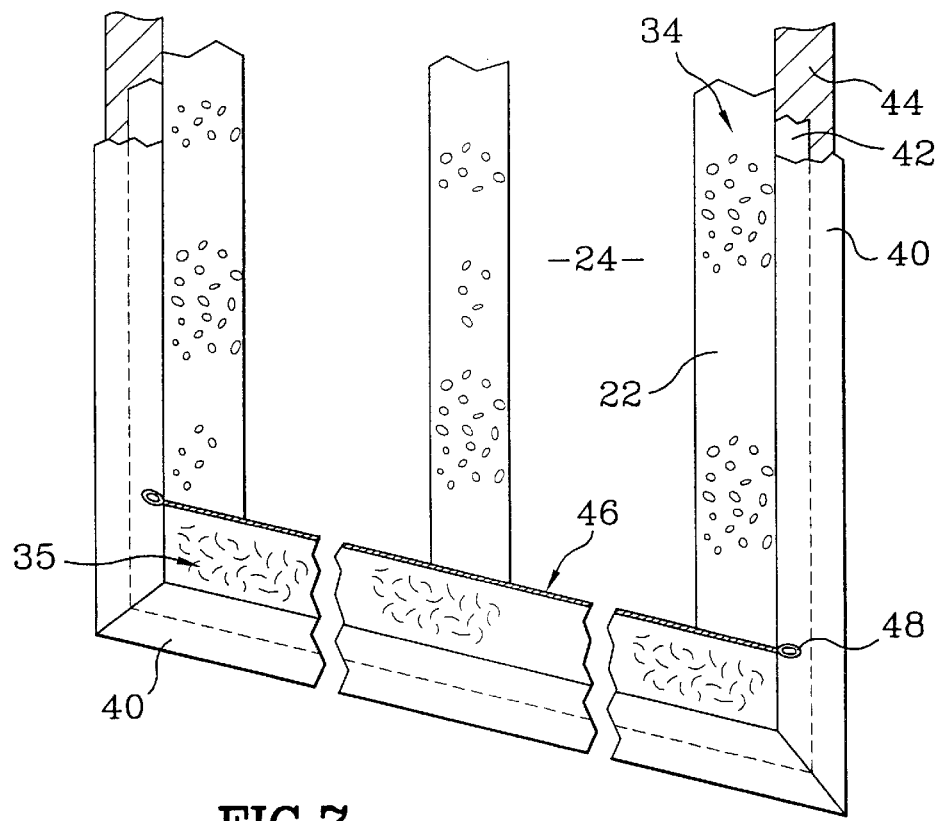
FIG. 7, a view from below of the end of a device, with integral application means.

Referring to FIGS. 6 and 7, there is shown in detail such a chamfer 38.

First of all, about the periphery of the plate, there is provided according to a preferred embodiment a layer 40 of a first adhesive strip such as an aluminum strip which ensures the protection of the surface of the support from any stain from the filling material 44 as will be further explained.

On this first adhesive strip 40, there is provided a second adhesive strip 42 of the type reinforced with glass fibers, of a lesser width than that of the filling material 44 forming the chamfer itself. This second adhesive strip has for its object to facilitate emplacement, because it permits withdrawing all of the mastic and the first adhesive strip 40, by peeling.

This filling material 44 is a mastic in the illustrated embodiment. It is disposed to make up the difference in thickness between the upper surface of the plate 16 and the upper surface of the adhesive strip 40.

This mastic is disposed at the end of the operation, to ensure a good finish.

There will also be noted in FIG. 7 a connection 46 disposed behind the strong adhesive layer 35, perpendicular to the airstream, receiving the ends of the double-face adhesive foam strips 34.

This connection is slightly prolonged beyond the longitudinal edges of the plate, on each side, by a prehensile loop 48, these loops being embedded in the filling material.

Such a connection facilitates the withdrawal of the device because after grasping the loops, once a portion of the mastic is removed, it suffices to exert a traction to cut the layer of adhesive of high tensile strength or at least to start its unsticking.

The assembly of the chamfer is withdrawn simultaneously with the subjacent adhesive strips, which frees access to the plate and it will be seen that the double-faced adhesive foam strip 34 can easily be withdrawn by peeling, after having withdrawn the plate 24, if this strip does not come off directly with the plate.

The structure until now is in its first condition, before applying the device, that is, in its undegraded condition.

Figure 4:
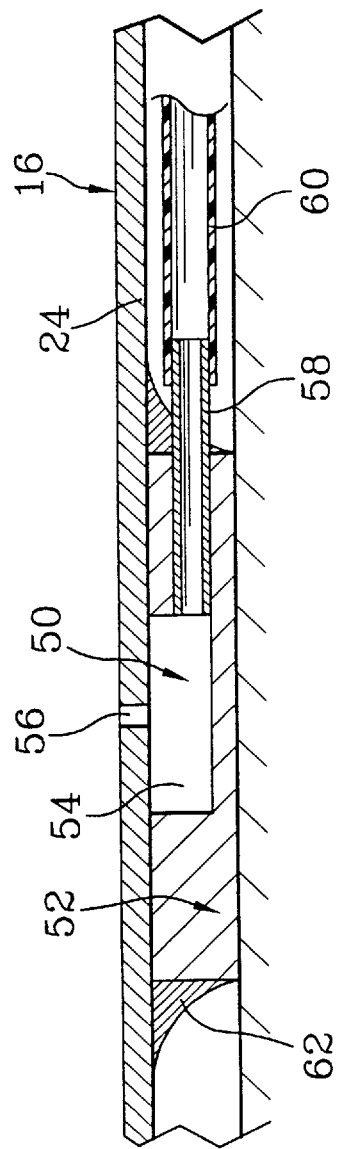
FIG. 4, a detailed view of the mounting of a detector as shown in FIG. 3C, in this case a stationary pressure gauge.

In FIG. 4, there is shown a stationary pressure gauge 50. This pressure gauge comprises a collector 52, with a recess 54 provided in said collector. Holes 56 are machined with high precision to obtain a neat edge, through the metallic plate 24.

These holes open into the recess 54.

The collector is completed by a rigid ferrule 58 which, on the one hand, opens, without projecting, within the recess 54 and on the other hand projects outside the collector to permit its connection to a flexible connection tube 60.

This collector is fixed by cementing below the plate 24 facing the holes 56.

A strip 62 ensures the sealing of the collector with the internal surface of the plate 24.

Figure 5:
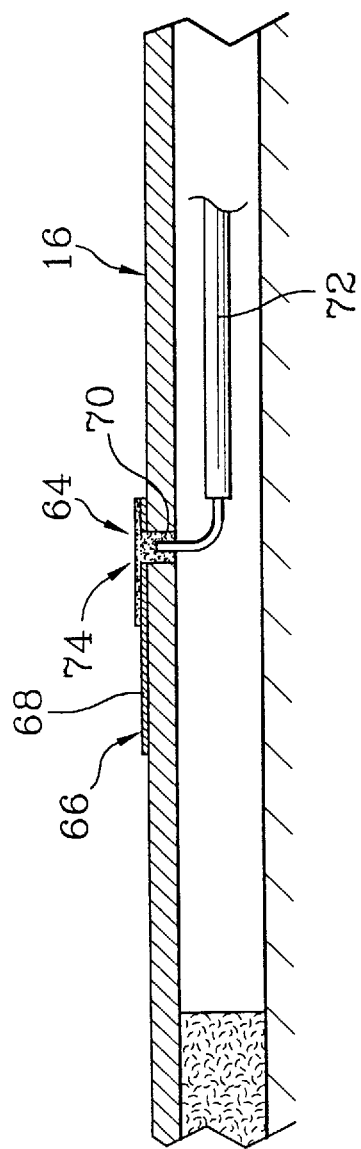
FIG. 5, a detailed view of the mounting of another type of detector, ill this case a hot film detector.

Similarly, in FIG. 5, there is shown the mounting of a detector 64 of the hot film type.

A hot film 66 is provided by a metallic deposit 68 under vacuum, directly on the upper surface of the plate which is of an insulating material sufficiently mechanically rigid, in this instance epoxy resin.

The hot film is thus produced over all the indicated surface, the connection points being prolonged in line with the holes 70 first machined in the plate for the electrical connections with the supply cable 72.

Each cable is stripped at its end, this stripped portion being disposed in the corresponding hole which is filled with a conductive paste 74, which extends beyond the surface over a very small thickness, thereby ensuring the electrical continuity between the hot film and the cable.

This conductive paste ensures simultaneously the closure of the hole in which it is disposed and the continuity of the aerodynamic profile.

Care should be taken that the excess thickness is limited to several micrometers, which can be considered to be negligible with respect to disturbances engendered in the airflow.

In certain cases where other types of visualization are used such as the display of airflow by thermal contrast, thanks to an infrared camera, it is necessary to reheat the plate and that this not have a too great thermal conductivity, such that this is made often in epoxy resin and a resistance is disposed on the internal surface of the plate. The method to provide such a resistance of small thickness is known from the art of providing printed circuits and is within the skill of those in the art.

This visualization can also be effected by thermosensitive crystals, disposed by spraying on the external surface of the plate. In this case, the resistance which is established is also used, it permits maintaining the liquid crystals in the operative temperature range.

Figure 8:
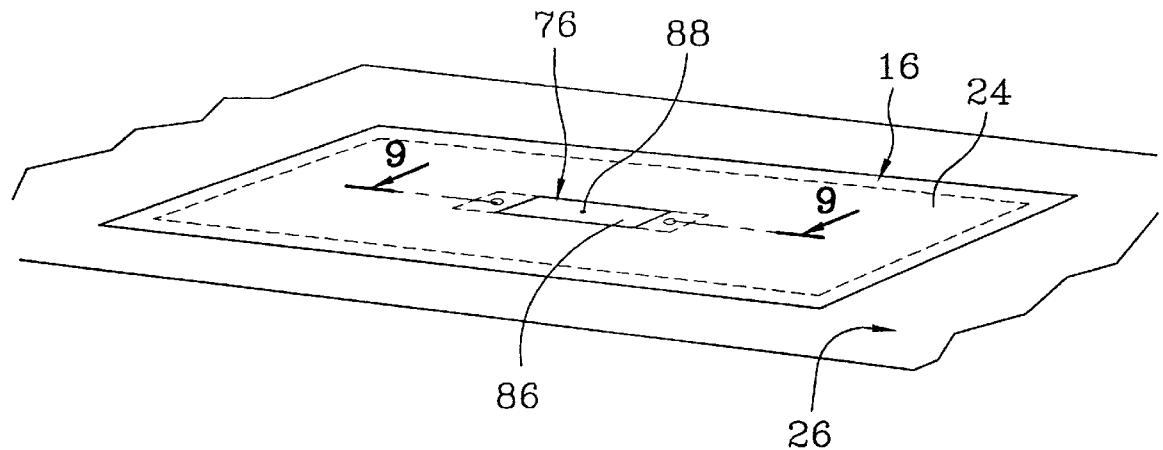
FIG. 8, a view of a flush unstationary pressure detector integrated into a plate.
Figure 9:
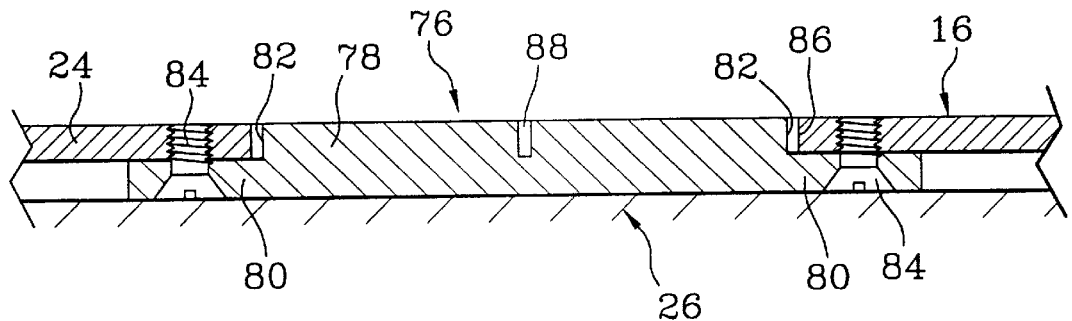
FIG. 9, a cross-sectional view on the line 9—9 of FIG. 8.

There can also be used a flush detector 76 for measuring instantaneous pressure. Reference to FIGS. 8 and 9 shows such a detector.

The detector 76 comprises a flat body 78 of a thickness at most equal to the distance which separates the instrumented surface 26 from the upper surface of the plate 24 of the support 16. This detector comprises two tongues 80 of a thickness at most equal to the free height below the plate with a cutout 82. Two screws 84 secure the body of the detector by tongues, to the plate 16. Thus the surface of the detector is flush with the surface of the plate 24, through a hole 86 provided in this plate 24, which hole is of the exact dimensions of the body of the detector.

The detector comprises in known manner a calibrated member 88 for the pressure gauge. This member is connected to the on-board instrumentation, in a manner identical to the preceding detectors.

It will be noted that the various detectors which have been described permit measuring on the structure itself parameters concerning the airflow without thereby disturbing this flow.

The structure is not subjected to any mechanical modification involving its integrity so that the procedures of emplacement and removal remain very simple.

The very small thickness of the plates permits configuration over the greatest portion of the surface of the structures, in any case for aircraft which lack sharp corners in any event.

What is claimed is:

1. An instrumented device for the study of airflow over a structure (10), comprising a support (16) forming a thin plate (24) adapted to be applied and shaped to the contour of a predetermined region (26) of said structure, connection means (22) for cementing a portion of an inner surface of said support to said predetermined region leaving a space (36) of low height between an inner surface of the plate (24) of the support and said predetermined region, said height being substantially equal to said thickness of said cementing means, instrumentation (18) connected to said support, a portion (28) of said instrumentation and wire connections (20) therefor being disposed in said space (36), whereby said device is adapted to form a skin on said structure (10).

2. A device as claimed in claim 1, wherein said cementing means (22) comprise a strip (34, 35) of double-faced adhesive.

3. A device according to claim 2, wherein said adhesive strip is of neoprene foam (34).

4. A device according to claim 2, further comprising a thin protective film removably disposed on a surface of said adhesive, an opposite surface of said adhesive being adhered to said support.

5. A device according to claim 2, and an adhesive strip of high tensile strength (35) disposed perpendicular to the first-mentioned adhesive strip (34).

6. A device according to claim 1, wherein said support is elongated.

7. A device according to claim 1, there being a chamfer (38) peripherally disposed about the support (16).

8. A device according to claim 7, wherein said chamfer (38) is an adhesive strip (40).

9. A device according to claim 7, wherein said chamfer is filling material of substantially triangular cross section.

10. A device as claimed in claim 6, further comprising a peripheral chamfer (38), and a reinforced strip (42) disposed between a portion of said peripheral chamfer and said predetermined region (26).

11. A device according to claim 5, further comprising a traction filament (46) disposed next to the adhesive strip (35) of high tensile strength, provided at its ends with gripping means (48) embedded in a mastic (44) so as to facilitate application.

12. A device according to claim 1, wherein said instrumentation comprises detectors (18) secured to an internal surface of said support (16), said support having passages (30) therethrough for communication of the detectors with airflow outside the support.

13. A device according to claim 1, wherein the support (16) comprises a layer of thermosensitive crystals disposed on the external surface of the plate (24) of said support.

14. A device according to claim 1, further comprising an electrical resistance on an internal surface of the plate to adjust the temperature of the plate.

15. A device according to claim 1, further comprising a stationary pressure gauge (50) which comprises a collector (52) with a recess (54) provided in said collector as well as holes (56) extending through the plate (24) to said recess (54), and a rigid tube (58) connecting said recess (54) with a flexible connection tube (60) for transmitting pressure.

16. A device according to claim 1, wherein said instrumentation includes a detector (76) flush with the surface of said plate (24) for detecting pressure at an exposed surface of said plate.

17. A device according to claim 1, wherein said plate is a metallic plate.

18. A device according to claim 1, wherein said plate is of epoxy resin.

19. A device according to claim 1, wherein said plate has a thickness of about one millimeter.

* * * * *